3,419,620
2-ETHOXY-METHYL-4,6-DINITRO-PHENOL
Heinz-Manfred Becher, Richard Sehring, and Karl Zeile, Ingelheim am Rhein, Germany, assignors to C. H. Boehringer Sohn, Ingelheim am Rhein, Germany, a limited partnership of Germany
No Drawing. Filed Dec. 24, 1963, Ser. No. 333,180
Claims priority, application Germany, Dec. 27, 1962, B 70,152; May 29, 1963, B 72,093
1 Claim. (Cl. 260—611)

This invention relates to pesticidal derivatives of 2-hydroxy-3,5-dinitro-benzyl alcohol, which is also known as 3,5-dinitro-saligenin or 3,5-dinitro-salicyl alcohol, as well as to pesticidal compositions comprising such derivatives as active ingredients.

More particularly, the present invention concerns compounds of the formula

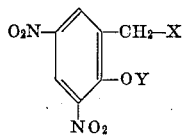

wherein X is halogen,

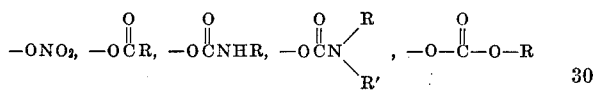

and Y is hydrogen,

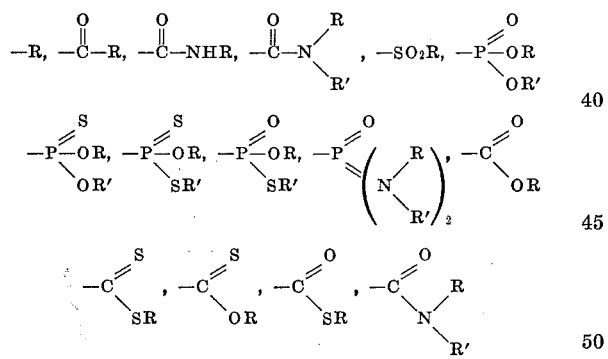

or a cation capable of forming a salt with a phenolic hydroxyl group, such as a mono- or polyvalent metal cation, ammonium, an organo-metallic cation or the cation of an organic amine, including a heterocyclic amine,
where R and R', which may be different or identical, are hydrogen, alkyl, alkenyl, alkinyl, cycloalkyl or aryl, each of which may be unsubstituted or substituted with one or more halogen, —NO₂, —OH, —NH₂, —CN, —COO alkyl or aryl substituents; the hydrocarbon chains of R and R' may be interrupted by heteroatoms, such as S, N and/or O, and such heteroatoms may also be interposed between the hydrocarbon chains and aryl substituents attached thereto, provided, however, that X cannot be acetoxy when Y is acetyl.

The compounds according to the present invention may be prepared from 2-hydroxy-3,5-dinitro-benzyl alcohol, which itself may be prepared by the method described by F. D. Chattaway and H. Irving in Journal of the Chemical Society (London) 1934, page 325.

More particularly, the compounds according to the present invention may be prepared by the following general methods:

A. From 2-hydroxy-3,5-dinitro-benzylalcohol
  (1) Free phenols (only the —CH₂OH group has reacted):
    (a) Reaction with acids, such as hydrohalic acids, nitric acid, glacial acetic acid, trichloroacetic acid, etc., leads to esters.
    (b) Reaction with acid anhydrides, ketenes or acid chlorides also leads to esters. For instance, SOCl₂→—CH₂Cl
       PBr₃→—CH₂Br acetic anhydride→—CH₂OCOCH₃ dialkyl carbamic acid chloride→-dialkyl carbamate.
    (c) Reaction with organic halogen compounds or dialkylsulfates leads to ethers.
  (2) Compounds in which both OH-groups of 3,5-dinitro-saligenin have reacted with the same ester-forming group:
    (a) Reaction with acid chlorides, acid anhydrides or ketenes in excess leads to esters. Reaction with isocyanates leads to carbamates (esters of carbamic acid).
  (3) Phenol esters (the OH-groups of 3,5-dinitro-saligenin have reacted with two different ester-forming groups):
    (a) Reaction of the free phenols obtained by procedure A(1)(a) above or their salts with acid chlorides, ketenes, acid anhydrides or isocyanates, such as phosphoric acid chlorides, sulfonic acid chlorides, carboxylic acid anhydrides, alkyl-isocyanates, etc.

B. From an intermediate product of the formula

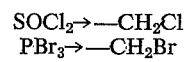

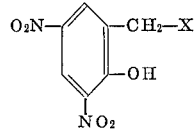

wherein X is halogen or —ONO₂.
  (1) Free phenols (only the —CH₂—X group has reacted):
    (a) Reaction of the intermediate products II with alcohols or alcoholates, phenols or phenolates leads to ethers.
    (b) Reaction of II with acids or salts leads to esters.
  (2) Compounds in which both OH-groups of 3,5-dinitro-saligenin are substituted:
    (a) Reaction of the free phenols obtained by procedures under B(1) above or their salts with acid chlorides, ketenes, and anhydrides or isocyanates as under A(3), again leads to the corresponding phenol esters.
    (b) Reaction of an intermediate product II with acid chlorides, ketenes, and anhydrides or isocyanates as under A (3) leads to phenol esters with an active —CH₂—X group. This active group may then be reacted by a procedure as under B(1) above to form the corresponding benzylesters or benzylethers. With water, phenol esters with a free —CH₂—OH group are formed. These compounds may be prepared only in this manner, because otherwise the —CH₂OH group reacts in most instances before the phenolic OH-group does.

C. Salts of the free phenols.
(1) Reaction with hydroxides, especially alkali metal hydroxides (water splits off).
(2) Reaction with alcoholates (alcohol splits off).
(3) Reaction with amines (addition salts).
(4) Double decomposition by reaction with other salts (cation exchange). For instance, the tributyl tin salt may be obtained by reacting tributyl tin chloride with the sodium salt of the corresponding free phenol (sodium chloride splits off).

The following examples further illustrate the present invention and will enable others skilled in the art to understand it more completely. It should be understood, however, that the invention is not limited to the particular examples given below.

Example 1.—Preparation of 2-hydroxy-3,5-dinitrobenzyl chloride 15.0 gm. (0.070 mol) of 2 - hydroxymethyl - 4,6 - dinitro-phenol were dissolved in 500 cc. of thionyl chloride and the solution was refluxed for 6 hours. Thereafter, the non-reacted excess of thionyl chloride was distilled off by vacuum distillation and the residue was recrystallized from a mixture of benzene and gasoline. 13.5 gm. (0.0583 mol; 83.3% of theory) of 2 - hydroxy - 3,5 - dinitrobenzyl chloride of the formula

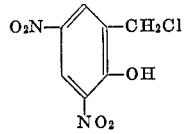

were obtained. The product had a melting point of 93–95° C.

Example 2.—Preparation of 2-hydroxy-3,5-dinitrobenzyl nitrate 10 gm. (0.0467) of 2-hydroxy-3,5-dinitro-benzyl alcohol were introduced in small portions, while stirring, into 30 cc. of fuming nitric acid which had been cooled to —5° C. The solution formed thereby was stirred for three hours at —5° C. and was then poured over 150 gm. of ice. The crystalline precipitate formed thereby was separated after ten minutes by vacuum filtration. While still moist, the filter cake was dissolved in benzene, and the solution was dried with magnesium sulfate. Thereafter, the reaction product was precipitated by adding gasoline to the benzene solution; the precipitate was separated by vacuum filtration and dried. 9.8 gm. (0.0378 mol; 81% of theory) of 2-hydroxy-3,5-dinitro-benzyl nitrate of the formula

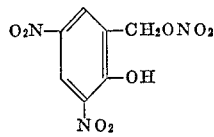

were obtained. The product had a melting point of 81–83° C.

Example 3.—Preparation of 2-ethoxymethyl-4,6-dinitrophenol 20 gm. (0.0862 mol) of 2-hydroxy-3,5-dinitrobenzyl chloride were dissolved in 100 cc. of ethanol, and the resulting solution was refluxed for eight hours. Thereafter, the major portion of the alcohol was distilled off. The crystalline precipitate formed thereby was separated by vacuum filtration from the small amount of mother liquor, and the filter cake was dried. 20.4 gm. (0.0844 mol; 97% of theory) of a yellow crystalline substance having a melting point of 66–67° C. were obtained. It was identified to be 2-ethoxymethyl-4,6-dinitro-phenol of the formula.

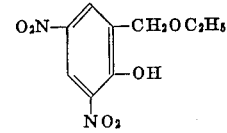

Recrystallization from ethanol did not change the melting point.

The same compound was obtained when 2-hydroxy-3,5-nitro-benzyl nitrate was used instead of 2-hydroxy-3,5-nitro-benzyl chloride. However, only 30 minutes of reflux of the ethanolic solution was necessary.

Using an analogous procedure, the following additional 2-hydroxy-3,5-dinitro-benzyl ethers were prepared from 2-hydroxy-3,5-dinitro-benzyl chloride and the alcohol indicated:

(a) 2-methoxy methyl-4,6-dinitro-phenol of the formula

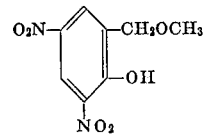

having a melting point of 60.5–61.5° C., from methyl alcohol.

(b) 2-n-propoxymethyl-4,6-dinitro-phenol of the formula

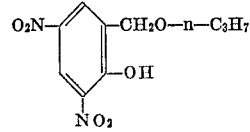

having a melting point of 25–28° C., from n-propanol.

(c) 2-isopropoxymethyl-4,6-dinitro-phenol of the formula

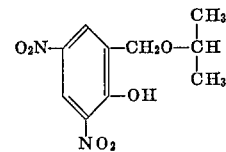

having a melting point of 84–85° C., from isopropanol.

(d) 2-n-butoxymethyl-4,6-dinitro-phenol of the

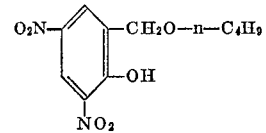

having a melting point of 49–51° C., from n-butyl alcohol.

(e) 2-n-pentoxymethyl-4,6-dinitro-phenol of the formula

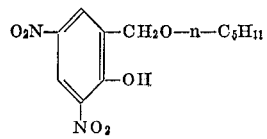

having a melting point of 47–49° C., from n-pentanol.

(f) 2-(α,β-dimethyl-propoxymethyl)-4,6-dinitrophenol of the formula

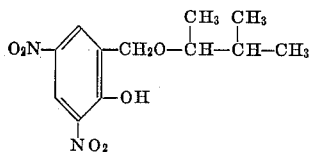

having a melting point of 46–47° C., from α,β-dimethyl-propanol.

(g) 2-(2'-ethyl-hexoxymethyl)-4,6-dinitro-phenol of the formula

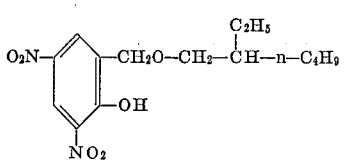

a non-distillable oil, from 2-ethyl-n-hexanol.

(h) 2 - (carbobutoxy-methoxy-methyl)-4,6-dinitro-phenol of the formula

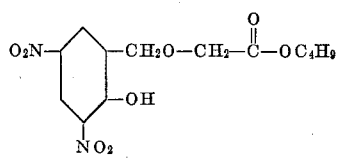

a non-distillable oil, from carbobutoxy-methanol.

Example 4.—Preparation of 3,5-dinitro-2-acetoxy-benzyl acetate 21.5 gm. (0.10 mol) of 2-hydroxy-3,5-dinitro-benzyl alcohol were dissolved in 300 cc. of absolute benzene. To the resulting solution, a solution of 15.7 gm. (0.20 mol) of acetylchloride in 50 cc. of absolute benzene and a solution of triethylamine in 50 cc. of benzene were simultaneously added dropwise over a period of 30 minutes, accompanied by stirring. The resulting reaction mixture was allowed to stand for 20 hours at room temperature, and the triethylamine hydrochloride precipitated during that time was filtered off. The filtrate was washed first with a saturated aqueous sodium bicarbonate solution and then with water, and was thereafter dried with magnesium sulfate. The benzene solvent was distilled off in vacuo until the residue was almost dry, whereupon it was triturated with petroleum ether. The crystalline substance formed thereby was vacuum filtered, and the filter cake was dried. 26.8 gm. (0.090 mol; 90% of theory) of 2-acetoxy-3,5-dinitro-benzyl acetate of the formula

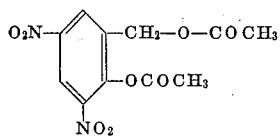

having a melting point of 76–79° C. were obtained. After recrystallization from ethanol the melting point was 78–79° C.

Using a procedure analogous to that described above, the following additional symmetrical diesters were prepared from 2-hydroxy-3,5-dinitro-benzyl alcohol and the acylchloride indicated in a molar ratio of 1:2:

(a) The compound of the formula

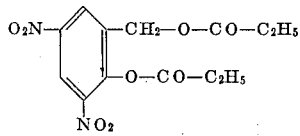

having a melting point of 64–66° C., with Cl—CO—$C_2H_5$.

(b) The compound of the formula

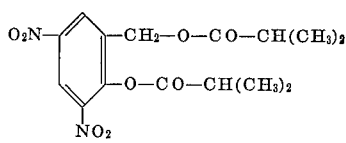

having a melting point of 52–54° C., with Cl—CO—$CH(CH_3)_2$.

(c) The compound of the formula

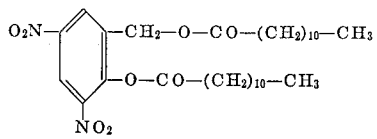

having a melting point of 49–51° C., with

Cl—CO—$(CH_2)_{10}$—$CH_3$ (d) The compound of the formula

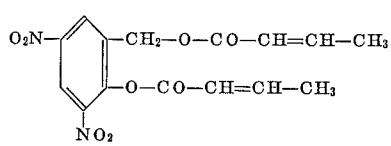

having a melting point of 70–72° C., with

Cl—CO—CH=CH—$CH_3$ (e) The compound of the formula

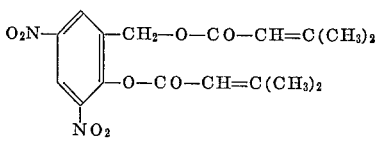

having a melting point of 77–79° C., with

Cl—CO—CH=$C(CH_3)_2$ (f) The compound of the formula

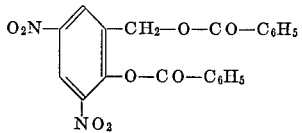

having a melting point of 120–121° C., with benzoyl chloride.

Example 5.—Preparation of O-[2-ethoxymethyl-4,6-dinitro-phenyl-(1)]-N-methyl-carbamate After addition of three drops of triethylamine, a solution of 12.1 gm. (0.05 mol) of 2-ethoxymethyl-4,6-dinitro-phenol in 25 cc. of absolute dioxane was admixed with 2.8 gm. (0.055 mol) of methylisocyanate. The mixture was allowed to stand at room temperature for twenty hours. Thereafter, 100 cc. of petroleum ether were added, and the precipitate formed thereby was separated by vacuum filtration. The filter cake was dissolved in benzene, and the resulting solution was washed first by shaking with a saturated aqueous sodium bicarbonate solution and then with water. Thereafter, the benzene solution was dried with magnesium sulfate, concentrated to a volume of 30 cc. in vacuo, and 30 cc. of petroleum ether were added. A crystalline precipitate formed, which was separated by vacuum filtration and dried. 10.3 gm. (0.344 mol); (69% of theory) of a white crystalline substance of the formula

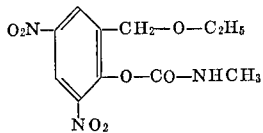

having a melting point of 120–121.5° C. were obtained. The melting point did not change after recrystallization from a mixture of benzene and gasoline.

Example 6.—Preparation of O-[2-ethoxymethyl-4,6-dinitro-phenyl-(1)]-N,N-dimethyl-carbamate A solution of 6.0 gm. (0.050 mol) of N,N-dimethyl-carbamic acid chloride in 25 cc. of absolute benzene was added dropwise at 2–5° C. over a period of one hour, accompanied by stirring, to a solution of 12.1 gm. (0.050 mol) of 2-ethoxymethyl-4,6-dinitro-phenol and 10.1 gm. (0.10 mol) of triethylamine in 75 ml. of absolute benzene. Thereafter, the reaction solution was allowed to stand at room temperature for twenty hours. The triethylamine hydrochloride which had crystallized out was separated by vacuum filtration, the filtrate was washed by shaking it first with a saturated aqueous sodium bicarbonate solution and then with water, dried with magnesium sulfate and evaporated in vacuo almost to dryness. The residue was triturated with petroleum ether, and the undissolved crystals were separated by vacuum filtration and dried. 9.1 gm. (0.0291 mol; 58.2% of theory) of the compound of the formula

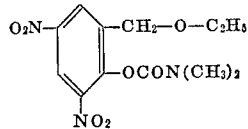

having a melting point of 87–88° C. were obtained. After recrystallization from benzene the substance had a constant melting point of 88–89° C.

Example 7.—Preparation of [2-ethoxymethyl-4,6-dinitro-phenyl-(1)]-acetate

A solution of 6.1 gm. (0.080 mol) of acetyl chloride in 100 cc. of absolute benzene was added dropwise at 2–5° C. over the course of one hour, accompanied by stirring, to a solution of 19.8 gm. (0.080 mol) of 2-ethoxymethyl-4,6-dinitro-phenol and 9.0 gm. (0.088 mol) of triethylamine in 300 cc. of absolute benzene. The resulting reaction mixture was allowed to stand for twenty hours at room temperature. Thereafter, the triethylamine hydrochloride which had crystallized out was separated by vacuum filtration, the filtrate was washed by shaking it first with a saturated aqueous sodium bicarbonate solution and then with water, dried with magnesium sulfate and evaporated in vacuo almost to dryness. The residue was triturated with petroleum ether, and the undissolved crystalline substance was separated by vacuum filtration and dried. 20.6 gm. (0.0724 mol; 90.5% of theory) of the compound of the formula

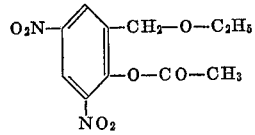

having a melting point of 72.5–74° C. were obtained. After recrystallization from benzene the product had a constant melting point of 74–75° C.

Example 8.—Preparation of the tributyl tin salt of 2-ethoxymethyl-4,6-dinitro-phenol 20 gm. of 2-ethoxymethyl - 4,6-dinitrophenol and 4.44 gm. of sodium methylate were dissolved in ethanol. Thereafter, 33.6 gm. of tributyl tin chloride were added to the solution, and the mixture was allowed to stand for five days at 50° C. The sodium chloride which had precipitated (4 gm.) was filtered off, the dark orange filtrate was evaporated in vacuo under exclusion of moisture, and the residue was triturated with petroleum ether whereby it crystallized. For purification, it was recrystallized from a mixture of ethanol and benzene. 10.5 gm. of a brown crystalline substance having a melting point of 189° C. were obtained, which was identified to be the tributyl tin salt of 2-ethoxy-methyl-4,6-dinitro-phenol of the formula

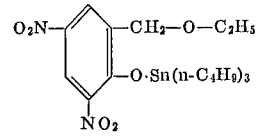

Example 9.—Preparation of O-(2-ethoxymethyl-4,6-dinitro-phenyl)-S-ethyl-thiocarbonate 24.2 gm. of 2-ethoxymethyl - 4,6-dinitro-phenol and 11.3 gm. of triethylamine were dissolved in 400 cc. of benzene, and then 13.7 gm. of chlorothioformic acid-S-ethyl ester dissolved in benzene were added thereto at 5° C. over the course of half an hour, accompanied by stirring. Triethylamine hydrochloride precipitated after a short time. The reaction mixture was stirred for twenty hours at room temperature. Thereafter, the triethylamine was separated by vacuum filtration and was washed with a small amount of benzene. The benzene solution (filtrate+wash liquid) was shaken twice with 50 cc. portions of a saturated aqueous sodium bicarbonate solution, and then with 50 cc. portions of distilled water until the aqueous phase remains colorless. The washed benzene solution was then dried, filtered through charcoal and evaporated to a volume of 50 cc. Gasoline was then added and the solution was scratched. 30.6 gm. of the compound of the formula

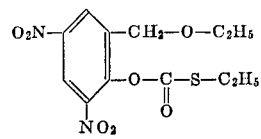

having a melting point of 27–28° C. were obtained.

(a) By a procedure analogous to that described above, 30 gm. of O-(2-ethoxymethyl-4,6-dinitro-phenyl)-O-ethyl-carbonate of the formula

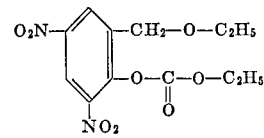

having a melting point of 65–67° C. were obtained from 24.2 gm. of 2-ethoxymethyl-4,6-dinitro-phenol and 12.0 gm. of chloroformic acid ethyl ester.

Example 10.—Preparation of 2-ethoxymethyl-4,6-dinitro-phenol toluene sulfonate 24.2 gm. of 2-ethoxymethyl - 4,6-dinitro-phenol were dissolved in 400 cc. of benzene together with 11.3 gm. of triethylamine. Thereafter, while stirring, a solution of 19.1 gm. of toluene sulfonic acid chloride in 100 cc. of benzene was added dropwise at room temperature. Triethylamine hydrochloride began to precipitate after a short time. The reaction mixture was refluxed at 50° C. for 15 hours, the precipitated triethylamine hydrochloride was separated by vacuum filtration, and the filter cake was washed twice with benzene. The benzene solution (filtrate+wash liquid) was shaken first twice with 50 cc. portions of a saturated aqueous sodium bicarbonate solution and then several times with 50 cc. portions of distilled water. The washed benzene solution was then dried over sodium sulfate, filtered through charcoal and evaporated to a volume of 50 cc. Gasoline was added and the solution was scratched. 32.0 gm. of the compound of the formula

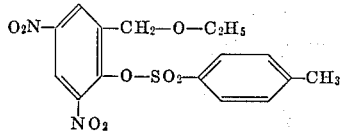

having a melting point of 116–118° C. were obtained.

Example 11.—Preparation of O,O-diethyl-O-[(2,4-dinitro-6-n-butoxy-methyl)-phenyl]-phosphate 13.5 gm. of 2-n-butoxymethyl-4,6-dinitro-phenol were dissolved in 60 cc. of toluene. 5.1 gm. of triethylamine were added to the solution, it was heated to 60° C., and 9 gm. of O,O-diethyl-phosphoric acid chloride were added dropwise. The reaction mixture was maintained at 60° C. for four hours, allowed to cool, and the precipitated triethylamine hydrochloride (8.5 g.m. was separated by vacuum filtration. The toluene solvent was distilled out of the filtrate, toward the end with the aid of an oil-vacuum pump and on a boiling water bath. The residue was taken up in methylene chloride, the resulting solution was shaken with 20 cc. of water, the aqueous phase was separated, the methylene chloride phase was dried over sodium sulfate, and the methylene chloride was distilled off. 20 gm. of the compound of the formula

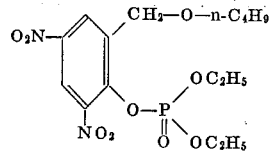

were obtained. The product was a yellowish-brown non-distillable oil.

In analogous fashion the following additional O.O-diethyl-phosphates were prepared:
(a) The compound of the formula

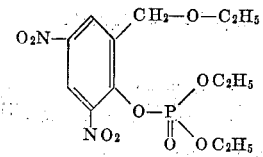

from O,O-diethyl-phosphoric acid chloride and 2-ethoxymethyl-4,6-dinitro-phenol. The product was a yellowish brown, non-distillable oil.

(b) The compound of the formula

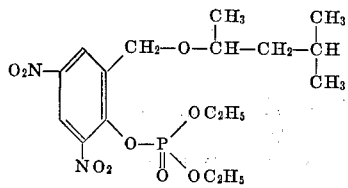

from O,O-diethyl-phosphoric acid chloride and

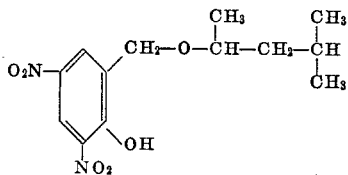

The product was a yellowish brown, non-distillable oil.
(c) The compound of the formula

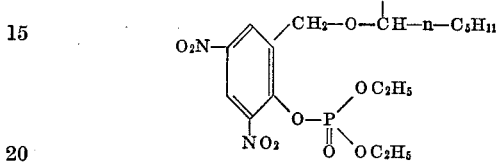

from O,O-diethyl-phosphoric acid chloride and 2-(α-ethyl-n-hexoxymethyl)-4,6-dinitro-phenol. The product was a yellowish-brown, non-distillable oil.

Example 12.—Preparation of the sodium salt of 2-ethoxymethyl-4,6-dinitrophenol 12.1 gm. (0.050 mol) of 2-ethoxymethyl-4,6-dinitrophenol were dissolved in 100 cc. of ethanol. To the resulting solution, 100 cc. of 0.5 N aqueous sodium hydroxide were added, so that the clear liquor had a pH value of 7.0–7.2. After half an hour the reaction mixture was evaporated in vacuo to dryness. 14.7 gm. of the compound of the formula

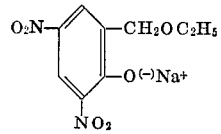

were obtained as a yellowish-brown powder.

Example 13.—Preparation of the methylamine salt of 2-methoxymethyl-4,6-dinitrophenol 15.0 gm. (0.066 mol) of 2-methoxymethyl-4,6-dinitrophenol were dissolved in 100 cc. of benzene and a solution of 2.04 gm. of methylamine in 50 cc. of benzene was added dropwise. The solution was stirred for 2 hours at room temperature. The resulting precipitate was separated by vacuum filtration and recrystallized from methanol. 8.8 gm. (0.034 mol, 51% of theory) of the compound of the formula

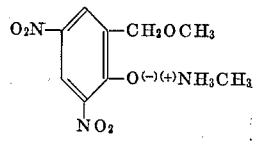

having a melting point of 154°, were obtained.
The following table summarizes additional compounds of the formula

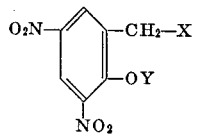

which were prepared.
The table shows the structure of substituents X and Y, the melting point and the physical properties of the product in each case, as well as the procedure for its preparation.

| Ex. No. | X | Y | M.P.° C. | Physical Properties | Prepared Analogous to Example No. |
|---|---|---|---|---|---|
| 12a | Br | H | 112–113 | Yellow, crystalline | 1 |
| 13a | —ONO₂ | —CO—CH₃ | 131–133 | White, crystalline | 7 |
| 14 | —ONO₂ | —CO—C₂H₅ | 105–108 | do | 7 |
| 15 | —ONO₂ | —CO—CH(CH₃)₂ | 54–58 | do | 7 |
| 16 | —ONO₂ | —CO—C₆H₅ | 112–114 | do | 7 |
| 17 | —OCH₃ | Na⁺ | | Yellowish-brown, crystalline | 12 |
| 18 | —OCH₃ | ⁺NH₃CH₃ | 154–156 | do | 13 |
| 19 | —OCH₃ | ⁺NH₂(C₂H₅)₂ | 102–105 | do | 13 |
| 20 | —OCH₃ | ⁺NH₃CH₂CH₂OH | 105–106 | do | 13 |
| 21 | —OCH₃ | —CO—CH₃ | 58–60 | White, crystalline | 7 |
| 22 | —OCH₃ | —CO—C₂H₅ | 69–71 | do | 7 |
| 23 | —OCH₃ | —CO(CH₂)₁₀CH₃ | 38–41 | do | 7 |
| 24 | —OCH₃ | —CO—CH=CH—CH₃ | 58–60 | do | 7 |
| 25 | —OCH₃ | —CO—CH=C(CH₃)₂ | 87–89 | do | 7 |
| 26 | —OCH₃ | —CO—CH₂Cl | 71–74 | do | 7 |
| 27 | —OCH₃ | —CO—C—Cl₂CH₃ | 58–59 | do | 7 |
| 28 | —OCH₃ | —CO—CH₂—C₆H₂Cl₃ (2,4,5-trichlorophenyl) | 99–101 | do | 7 |
| 29 | —OC₂H₅ | Na⁺ | | Yellowish-brown, crystalline | 12 |
| 30 | —OC₂H₅ | 1/3 Fe⁺⁺⁺ | 170–170.5 | do | 12 |
| 31 | —OC₂H₅ | 1/2 Mg⁺⁺ | ¹ 65–72 | Brown, amorphous | 12 |
| 32 | —OC₂H₅ | 1/2 Cu⁺⁺ | ¹ 181–188 | do | 12 |
| 33 | —OC₂H₅ | 1/2(+)NH₃—(CH₂)₂—(+)NH₃ | 180–190 | Yellowish-brown, crystalline | 13 |
| 34 | —OC₂H₅ | —COCH₃ | 74–75 | White, crystalline | 7 |
| 35 | —OC₂H₅ | —CO(CH₂)₁₀CH₃ | (²) | Yellowish, crystalline | 7 |
| 36 | —OC₂H₅ | —CO—CH₂—Cl | 61–62.5 | White, crystalline | 7 |
| 37 | —OC₂H₅ | —CO—CH₂—O—C₆H₃(CH₃)(Cl) | 82–83 | do | 7 |
| 38 | —OC₂H₅ | —CO—CH₂—C₆H₃Cl₂ | 68 | do | 7 |
| 39 | —OC₂H₅ | —CO—CH₂—O—C₆H₂Cl₃ | 105–107 | do | 7 |
| 40 | —OC₂H₅ | —CO—CH(CH₃)—O—C₆H₂Cl₃ | 88–90 | do | 7 |
| 41 | —OC₂H₅ | —CO—NH—C₆H₄—Cl | 113–114 | do | 5 |
| 42 | —OC₂H₅ | —SO₂CH₃ | 73–74 | do | 10 |
| 43 | —OC₂H₅ | —C(=O)—OC₂H₅ | 66–67 | do | 9 |
| 44 | —OC₂H₅ | —C(=S)—OC₂H₅ | | Light yellow, non-distillable oil | 9 |
| 45 | —O(CH₂)₂CH₃ | ⁺NH₃CH₃ | 146–149 | Yellow, crystalline | 13 |
| 46 | —O(CH₂)₂CH₃ | —CO—CH₃ | 65–66 | White, crystalline | 7 |
| 47 | —O(CH₂)₂CH₃ | —CO—CH(CH₃)₂ | | Yellowish-brown, non-distillable oil | 7 |
| 48 | —O(CH₂)₂CH₃ | CO(CH₂)₁₀CH₃ | | do | 7 |
| 49 | —O(CH₂)₂CH₃ | —CO—NH—CH₃ | 99–101 | White, crystalline | 5 |
| 50 | —O—CH(CH₃)₂ | CO—CH₃ | 67–68 | do | 7 |
| 51 | —O—CH(CH₃)₂ | CO—CH(CH₃)₂ | 49–51 | do | 7 |
| 52 | —O—CH(CH₃)₂ | CO—C₆H₅ | 80.5–81.5 | do | 7 |
| 53 | —O—CH(CH₃)₂ | CO—CH₂O—C₆H₂Cl₃ | 95–98 | do | 7 |
| 54 | —O—(CH₂)₃CH₃ | —CO—CH₃ | 67–69 | do | 7 |
| 55 | —O—(CH₂)₃CH₃ | —CO—C₂H₅ | | Yellow, non-distillable oil | 7 |
| 56 | —O—(CH₂)₃CH₃ | —CO—CH(CH₃)₂ | | do | 7 |
| 57 | —O—(CH₂)₃CH₃ | —CO—CH=CH—CH₃ | | do | 7 |
| 58 | —O—(CH₂)₃CH₃ | —CO—CH=C(CH₃)₂ | 35–36 | Yellowish, crystalline | 7 |
| 59 | —O—(CH₂)₃CH₃ | —CO—C₆H₅ | 50–52 | White, crystalline | 7 |

| Ex. No. | X | Y | M.P.°C. | Physical Properties | Prepared Analogous to Example No. |
|---|---|---|---|---|---|
| 60 | $-O-CH(CH_3)-C_2H_5$ | H | 81.5 | Yellow, crystalline | 3 |
| 61 | $-O-CH(CH_3)-C_3H_5$ | $-CO-CH_3$ | | Yellow non-distillable oil | 7 |
| 62 | $-O-CH(CH_3)-C_2H_5$ | $-COC_2H_5$ | | do | 7 |
| 63 | $-O-CH(CH_3)-C_2H_5$ | $-CO-CH(CH_3)_2$ | | do | 7 |
| 64 | $-O-CH(CH_3)-C_2H_5$ | $-CO-CH=CH-CH_3$ | | do | 7 |
| 65 | $-O-CH(CH_3)-C_2H_5$ | $-OC-CH=C(CH_3)_2$ | | do | 7 |
| 66 | $-O-CH_2CH(CH_3)_2$ | $-H$ | 76 | Yellow, crystalline | 3 |
| 67 | $-O-CH_2CH(CH_3)_2$ | $-CO-CH_3$ | | Yellow, non-distillable oil | 7 |
| 68 | $-O-CH_2CH(CH_3)_2$ | $-CO-C_2H_5$ | | do | 7 |
| 69 | $-O-CH_2CH(CH_3)_2$ | $-CO-CH(CH_3)_2$ | 45–46 | White, crystalline | 7 |
| 70 | $-O-CH_2CH(CH_3)_2$ | $-CO-CH=CH-CH_3$ | | Yellow, non-distillable oil | 7 |
| 71 | $-O-CH_2CH(CH_3)_2$ | $-CO-CH=C(CH_3)_2$ | | do | 7 |
| 72 | $-O-CH_2CH(CH_3)_2$ | $-CO-CH_2Cl$ | | do | 7 |
| 73 | $-O-C(CH_3)_3$ | H | 123 | Yellow, crystalline | 3 |
| 74 | $-O-C(CH_3)_3$ | $CO-CH_3$ | 78–79 | White, crystalline | 7 |
| 75 | $-O(CH_2)_4CH_3$ | $-CO-CH_3$ | 44–47 | do | 7 |
| 76 | $-O(CH_2)_4CH_3$ | $-CO-CH(CH_3)_2$ | | Yellow, non-distillable oil | 7 |
| 77 | $-O(CH_2)_4CH_3$ | $-CO(CH_2)_{10}CH_3$ | | Yellowish-brown, non-distillable oil | 7 |
| 78 | $-O(CH_2)_4CH_3$ | $-CO-CH=C(CH_3)_2$ | | do | 7 |
| 79 | $-O(CH_2)_2CH(CH_3)_2$ | $-CO-CH_3$ | 15–17 | Yellowish, crystalline | 7 |
| 80 | $-O(CH_2)_2CH(CH_3)_2$ | $-CO-C_2H_5$ | | Yellowish-brown, non-distillable oil | 7 |
| 81 | $-O(CH_2)_2CH(CH_3)_2$ | $-CO-CH(CH_3)_2$ | | do | 7 |
| 82 | $-O-CH_2CH(C_2H_5)-nC_4H_9$ | $-CO-CH_3$ | | do | 7 |
| 83 | $-O-CH_2CH(C_2H_5)-nC_4H_9$ | $-CO-CH(CH_3)_2$ | | do | 7 |
| 84 | $-O-CH_2CH(C_2H_5)-nC_4H_9$ | $-CO(CH_2)_{10}CH_3$ | | do | 7 |
| 85 | $-O-CH_2COO-nC_4H_9$ | $-CO-CH_3$ | | Yellow, non-distillable oil | 7 |
| 86 | $-O-CH_2COO-nC_4H_9$ | $-CO-CH(CH_3)_2$ | | do | 7 |
| 87 | $-O-CH_2COO-nC_4H_9$ | $-CO-CH(CH_3)_2$ | | do | 7 |
| 88 | $-O-CH(CH_3)-COO-C_2H_5$ | H | | Yellowish-brown, non-distillable oil | 3 |
| 89 | $-O-CH(CH_3)-COO(CH_2)_3CH_3$ | H | | Yellow, crystalline | 3 |
| 90 | $-O-C_6H_5$ | H | 87–89 | do | 3 |
| 91 | $-O-CO-CH_3$ | $-CO-CH(CH_3)_2$ | 67–69 | White, crystalline | 7 |
| 92 | $-O-CO-CH_3$ | $CO-CH_2Cl$ | 115–117 | do | 7 |
| 93 | $-O-CO-CH_3$ | $CO-CH_2-O-C_6H_2Cl_3$ (2,4,5-trichlorophenoxy) | 127–130 | do | 7 |
| 94 | $-O-CO-CH(CH_3)_2$ | $-CO-CH_3$ | 50–52 | do | 7 |
| 95 | $-O-CO-CH_2Cl$ | $-CO-CH_3$ | 78–80 | do | 7 |
| 96 | $-O-CO-CH_2Cl$ | $-CO-CH_2Cl$ | | Yellow, non-distillable oil | 4 |
| 97 | $-O-CO-CH-Cl_2$ | H | 71.5–73 | Yellow, crystalline | 3 |
| 98 | $-O-CO-C-Cl_3$ | H | | Yellow, non-distillable oil | 3 |
| 99 | $-O-CO-C-Cl_2CH_3$ | H | | do | 3 |
| 100 | $-O-(CH_2)_2-O-C_6H_5$ | H | 146–148 | Yellow crystalline | 3 |
| 101 | $-O-(CH_2)_2-O-C_6H_5$ | $-CO_2CH_3$ | 73–75 | White, crystalline | 7 |
| 102 | $-O(CH_2)_2-O-C_6H_3Cl_2$ (2,4-dichlorophenoxy) | H | 134–135 | Yellow, crystalline | 3 |
| 103 | $-O-SO_2CH_3$ | $-SO_2CH_3$ | 100–101 | White, crystalline | 10 |

The compounds according to the present invention, that is, those embraced by Formula I above, have useful properties. More particularly, they exhibit highly effective acaricidal, insecticidal, ovicidal, herbicidal and fungicidal properties. They are especially effective against broad-leaf plants, the eggs of aphids and apple leaf suckers, spider mites, flies, bugs, mildew fungi and the like.

Fos pesticidal, herbicidal and fungicidal application the compounds according to the present invention are combined with conventional gaseous, liquid or solid inert carriers to form compositions such as dusting powders, suspensions, emulsions, solutions, aerosols and the like. If desired or necessary, these compositions may also comprise other pesticidal, herbicidal or fungicidal ingredients as well as such additives as emulsifiers, extenders or agents which increase the adhering properties of the compositions to surfaces, plants or objects to which they may be applied.

The concentration of the compounds according to the present invention in these compositions may be as low as 0.005% by weight, based on the overall weight of the composition, and seldom, if ever, needs to be higher than 5% by weight.

The following examples illustrate various types of compositions comprising a compound of the present invention as an active pesticidal, herbicidal or fungicidal ingredient.

Example 104.—Emulsion 40 gm. of 2-ethoxymethyl-4,6-dinitro-phenol, 20 gm. of xylene and 40 gm. of naphthalene sulfonate were emulsified in an amount of water such that the emulsion had an active ingredient concentration of 0.01 to 5% by weight. The emulsion destroyed broad-leaf plants and a few types of grass. In addition, the emulsion destroyed the eggs of aphids and apple leaf suckers.

Example 105.—Emulsion 40 gm. of 2-($\alpha$-methyl-propoxymethyl)-4,6-dinitro-phenol, 20 gm. of xylene and 40 gm. of naphthalene sulfonate were emulsified in an amount of water such that the acive ingredient concentration was 0.01 to 5% by weight. The emulsion destroyed broad-leaf plants.

Example 106.——Emulsion 40 gm. of 2-hydroxy-3,5-dinitro-benzyl nitrate, 20 gm. of xylene and 10 gm. of an alkyl-naphthalene sulfonate were admixed, and the mixture was emulsified in an amount of water such that the active ingredient concentration in the emulsion was 0.01 to 5% by weight. The emulsion destroyed broad-leaf plants.

Example 107.—Suspension 25 gm. of 2-isopropoxymethyl-4,6-dinitro-phenyl isobutyrate, 5 gm. of an alkyl-naphthalene sulfonate and 20 gm. of kaolin were thoroughly admixed by milling, and the resulting mixture was suspended in an amount of water such that the active ingredient concentration in the suspension was 0.01 to 1% by weight. When bean plants infested with spider mites were sprayed with this suspension, the mite population was 100% destroyed.

Example 108.—Suspension 25 gm. of 2-($\gamma$-methyl-butoxymethyl)-4,6-dinitro-phenyl acetate, 5 gm. of naphthalene sulfonate and 20 gm. of kaolin were thoroughly admixed by milling and the resulting mixture was supended in an amount of water such that the active ingredient concentration in the suspension was 0.01 to 1% by weight. The suspension was effective against mildew fungi.

Example 109.—Dusting powder 2 parts by weight of 2-($\gamma$-methyl-butoxymethyl)-4,6-dinitro-phenyl acetate and 98 parts by weight of kaolin were admixed, and the mixture was milled into a fine powder, which was highly effective against mildew fungi.

Although the above composition examples illustrate only a few selected compounds according to the present invention as active ingredients, it should be understood that any of the other compounds embraced by Formula I, as well as the diacetate of 3,5-dinitro-saligenin may be substituted for the illustrated compounds in these compositions.

Example 110.—Emulsion 40 gm. of O,O-diethyl-0-2,4-dinitro-6-butoxymethyl-phenyl-phosphate, 20 gm. of xylene and 40 gm. of naphthalene sulfonate were emulsified in an amount of water such that the active ingredient concentration was 0.01 to 5% by weight. The emulsion was effective against flies and bugs.

While the present invention has been illustrated with the aid of certain specific embodiments thereof, it will be readily apparent to others skilled in the art that the invention is not limited to those embodiments and that various changes and modifications may be made without departing from the spirit of the invention or the scope of the appended claim.

We claim:
1. 2-ethoxymethyl-4,6-dinitro-phenol.

References Cited

UNITED STATES PATENTS

| | | | |
|---|---|---|---|
| 2,166,121 | 7/1939 | Boyce | 260—622 X |
| 2,225,619 | 12/1940 | Britton et al. | 260—622 X |
| 2,623,818 | 12/1952 | Hanson et al. | 260—622 |
| 2,631,169 | 3/1953 | Chiddix et al. | 260—622 |

BERNARD HELFIN, *Primary Examiner.*

U.S. Cl X.R.

260—622, 612, 469, 471, 473, 478, 479, 470, 481, 475, 482, 483, 484, 487, 464, 466, 456, 455, 463, 950, 953, 954, 966, 963, 964, 965, 959, 429.7; 167—30; 71—118, 121, 103, 87, 86, 100, 79, 111, 107, 105, 88